United States Patent
Choi

(10) Patent No.: US 8,126,292 B2
(45) Date of Patent: Feb. 28, 2012

(54) APPARATUS AND METHOD FOR PROCESSING IMAGE SIGNAL WITHOUT REQUIRING HIGH MEMORY BANDWIDTH

(75) Inventor: Ho-youn Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/983,991

(22) Filed: Jan. 4, 2011

(65) Prior Publication Data

US 2011/0097013 A1 Apr. 28, 2011

Related U.S. Application Data

(62) Division of application No. 11/620,938, filed on Jan. 8, 2007, now Pat. No. 7,885,485.

(30) Foreign Application Priority Data

Jan. 10, 2006 (KR) ........................ 10-2006-0002675

(51) Int. Cl.
*G06K 9/32* (2006.01)
(52) U.S. Cl. ........................................ 382/298; 348/565
(58) Field of Classification Search .................. 382/298; 348/565
See application file for complete search history.

(56) References Cited

U.S. PATENT DOCUMENTS

| 6,774,912 B1 * | 8/2004 | Ahmed et al. ................ 345/629 |
| 6,937,291 B1 * | 8/2005 | Gryskiewicz ................ 348/581 |
| 7,116,828 B2 * | 10/2006 | Wells ............................ 382/233 |
| 2004/0131276 A1 * | 7/2004 | Hudson ........................ 382/276 |

* cited by examiner

*Primary Examiner* — Matthew Bella
*Assistant Examiner* — Dennis Rosario
(74) *Attorney, Agent, or Firm* — F. Chau & Associates, LLC

(57) ABSTRACT

An image signal processor for processing an input image signal to output an output image signal includes an input unit receiving the input image signal, a noise removal unit removing noise from the input image signal, and a scaler reducing, maintaining or magnifying the image size of the input image signal. The scaler directly receives the input image signal from the input unit or the noise removal unit in response to a route control signal, reduces the image size of the input image signal when the image size of the input image signal is larger than the image size of the output image signal and stores the image signal with a reduced image size in a memory. The scaler maintains or magnifies the image size of the image signal stored in the memory and outputs the image signal with a maintained or magnified image size as the output image signal.

18 Claims, 12 Drawing Sheets

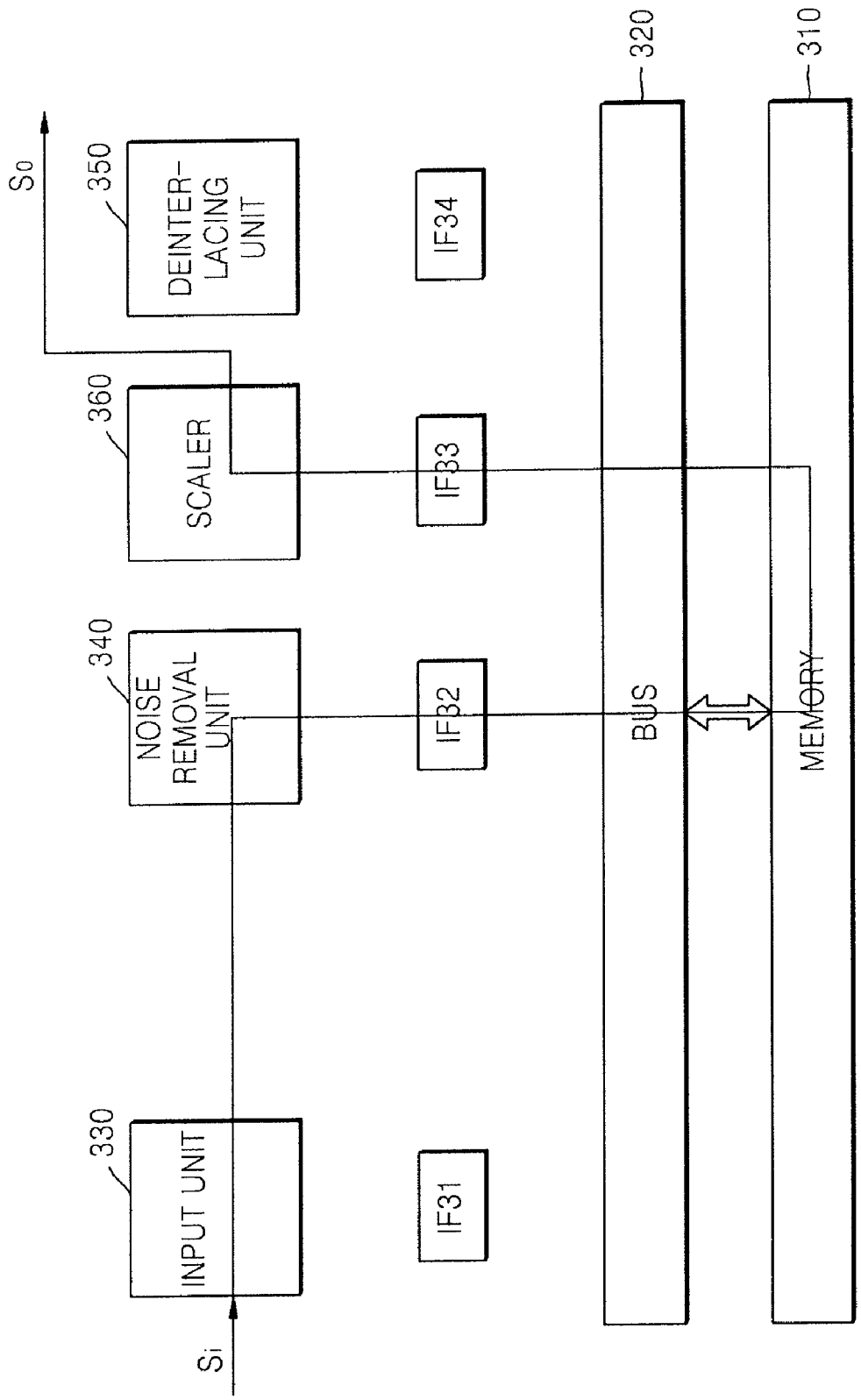

APPARATUS AND METHOD FOR PROCESSING IMAGE SIGNAL WITHOUT REQUIRING HIGH MEMORY BANDWIDTH

CROSS-REFERENCE TO RELATED PATENT APPLICATION

This application is a divisional of application Ser. No. 11/620,938 filed Jan. 8, 2007, now U.S. Pat. No. 7,885,485 which claims the priority under 35 U.S.C. §119 to Korean Patent Application, 10-2006-0002675, filed on Jan. 10, 2006, in the Korean Intellectual Property Office, the disclosures of which are each incorporated by reference herein in their entireties.

BACKGROUND OF THE INVENTION

1. Technical Field

The present disclosure relates to an image signal processing apparatus and method, and more particularly, to a image signal processing apparatus and method which minimizes the number of memory accesses and does not require a high memory bandwidth.

2. Discussion of the Related Art

An image signal captured by a video camera or a camcorder is transmitted to a display device such as a digital TV via an image signal processor. The image signal processor removes noise from the image signal, deinterlaces the image signal when the image signal is an interlaced image signal, and scales the image signal when necessary.

FIG. 1 is a block diagram of a conventional image signal processor. The image signal processor includes a memory 110, a bus 120, a plurality of interface units IF11, IF12, IF13 and IF14, an input unit 130, a noise removal unit 140, a deinterlacing unit 150, and a scaler 160. The image signal processor receives and processes an input image signal Si and outputs an output image signal So.

The image signal Si input to the image signal processor passes through the input unit 130, the interface units IF11 and the bus 120 and is then stored in the memory 110. The image signal Si stored in the memory is input to the noise removal unit 140 via the bus 120 and the interface unit IF12 to generate a filtered image signal. The filtered image signal is stored in the memory 110 via the interface unit IF12 and the bus 120. When the input image signal Si is an interlaced image signal, the filtered image signal is input to the deinterlacing unit 150 via the bus 120 and the interface unit IF13 to generate a deinterlaced image signal. The deinterlaced image signal passes through the interface unit IF13 and the bus 120 and is stored in the memory 110. The deinterlaced image signal stored in the memory 110 is input to the scaler 160 via the bus 120 and the interface unit IF14. The scaler 160 scales the image signal and outputs the scaled image signal as the output image signal So. The output image signal So is transmitted to a video processing block that performs, for example, graphic processing.

In the aforementioned image signal processing operation, frequent memory accesses are carried out. These memory accesses delay image signal processing. When processing a high definition (HD) image signal having a large data capacity, the experienced image signal processing delay is exacerbated.

The input image signal Si is stored in the form of multiple lines of video data in the memory 110. When the size of an image corresponding to the input image signal Si (i.e., the image size of the input image signal) is larger than the size of an image corresponding to the output image signal So (i.e., the image size of the output image signal), the scaler 160 should simultaneously read at least two lines of video data from the memory 110 for a single memory access. For example, when the image size of the input image signal Si is twice the image size of the output image signal, the scaler 160 should simultaneously read two lines of video data for each single memory access.

As the quantity of data read by the scaler 160 for a single memory access increases, a higher memory bandwidth is required. However, this becomes a problem in image signal processing because memory bandwidth is limited.

FIG. 2 is a block diagram of a conventional image signal processor used for a picture in picture (PIP) mode. To construct a double picture in the PIP mode, more than two kinds of image signals are required. A main picture of the double picture is formed from a main output image signal So1 generated by processing a main input image signal Si1 and a sub picture of the double picture is formed from a sub output image signal So2 generated by processing a sub input image signal Si2.

The image signal processor of FIG. 2 includes a memory 210, a bus 220, a plurality of interface units IF21 through IF28 and an output multiplexer 270. In FIG. 2, a first input unit 232, a first noise removal unit 242, a first deinterlacing unit 251 and a first scaler 262 process the main input image signal Si1 while the second input unit 234, a second noise removal unit 244, a second deinterlacing unit 254 and a second scaler 264 process the sub input image signal Si2.

The image signal processor of FIG. 2 should process a quantity of data larger than the quantity of data processed by the image signal processor of FIG. 1 in order to construct the PIP double picture. Accordingly, memory accesses should be performed more frequently and a higher memory bandwidth is required.

Thus, there is a need for an image signal processing apparatus and method which minimize the number of memory accesses and require a smaller memory bandwidth.

SUMMARY OF THE INVENTION

According to an exemplary embodiment of the present invention, there is provided an image signal processor for processing an input image signal to output an output image signal. The image signal processor includes an input unit receiving the input image signal, a noise removal unit removing noise from the input image signal, and a scaler reducing, maintaining or magnifying the image size of an image signal input thereto. The scaler directly receives the input image signal from the input unit or the noise removal unit in response to a route control signal, reduces the image size of the input image signal when the image size of the input image signal is larger than the image size of the output image signal and stores the image signal with a reduced image size in a memory. The scaler maintains or magnifies the image size of the image signal stored in the memory and outputs the image signal with a maintained or magnified image size as the output image signal.

According to an exemplary embodiment of the present invention, there is provided a method of processing a image signal. The method includes the steps of directly transmitting an input image signal from an input unit or a noise removal unit to a scaler when the image size of the input image signal is larger than the image size of the output image signal, reducing the image size of the input image signal directly transmitted to the scaler to correspond to the image size of the output image signal to generate a reduced image signal and storing the reduced image signal in the memory, and reading the reduced image signal from the memory and outputting the read image signal as the output image signal.

According to an exemplary embodiment of the present invention, there is provided a image signal processor for processing a main input image signal and a sub input image signal for forming a PIP image. The image signal processor includes a first input unit receiving the main input image signal, a second input unit receiving the sub input image signal, a noise removal unit removing noise from an image signal input thereto, a deinterlacing unit deinterlacing an image signal input thereto, first and second scalers scaling the image sizes of the main and sub input image signals, first and second multiplexers controlling routes of the main and sub input image signals, and an output multiplexer receiving a main output image signal and a sub output image signal output from the first or second scaler. The main input image signal and the sub input image signal may be directly transmitted to the noise removal unit or the first and second scalers without passing through a memory. The first or second scaler may reduce the image size of the main input image signal or the sub input image signal to correspond to the image size of the main output image signal or the sub output image signal and store the image signal with a reduced image size in the memory.

BRIEF DESCRIPTION OF THE DRAWINGS

The above and other features of the present invention will become more readily apparent by describing in detail exemplary embodiments thereof with reference to the accompanying drawings in which:

FIGS. 4A through 4E illustrate input image signal processing routes in the image signal processor of FIG. 3;

DETAILED DESCRIPTION OF EXEMPLARY EMBODIMENTS

The present invention will now be described more fully with reference to the accompanying drawings, in which exemplary embodiments of the invention are shown. The invention may, however, be embodied in many different forms and should not be construed as being limited to the embodiments set forth herein.

Figure 1:
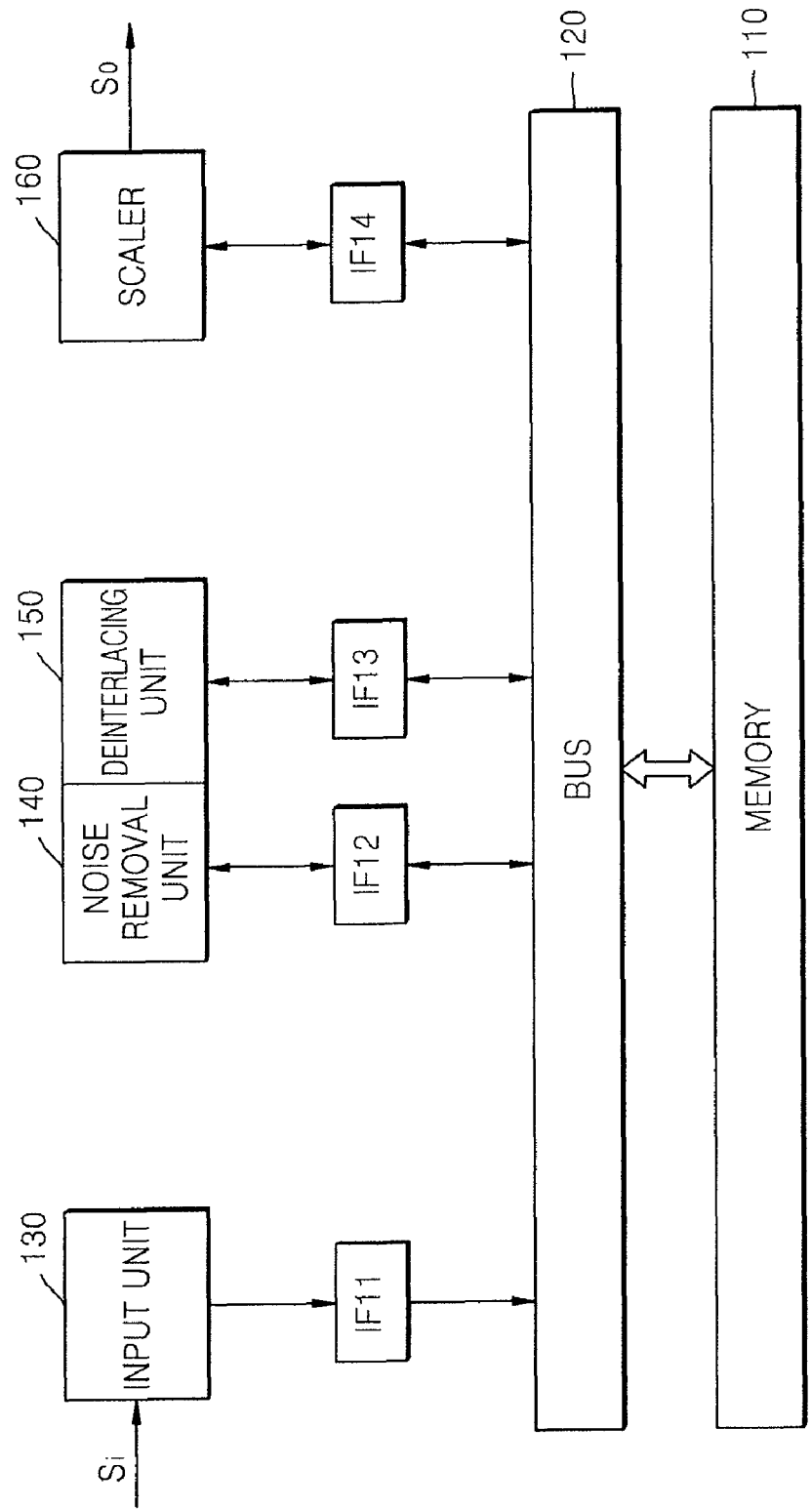
FIG. 1 is a block diagram of a conventional image signal processor.
Figure 2:
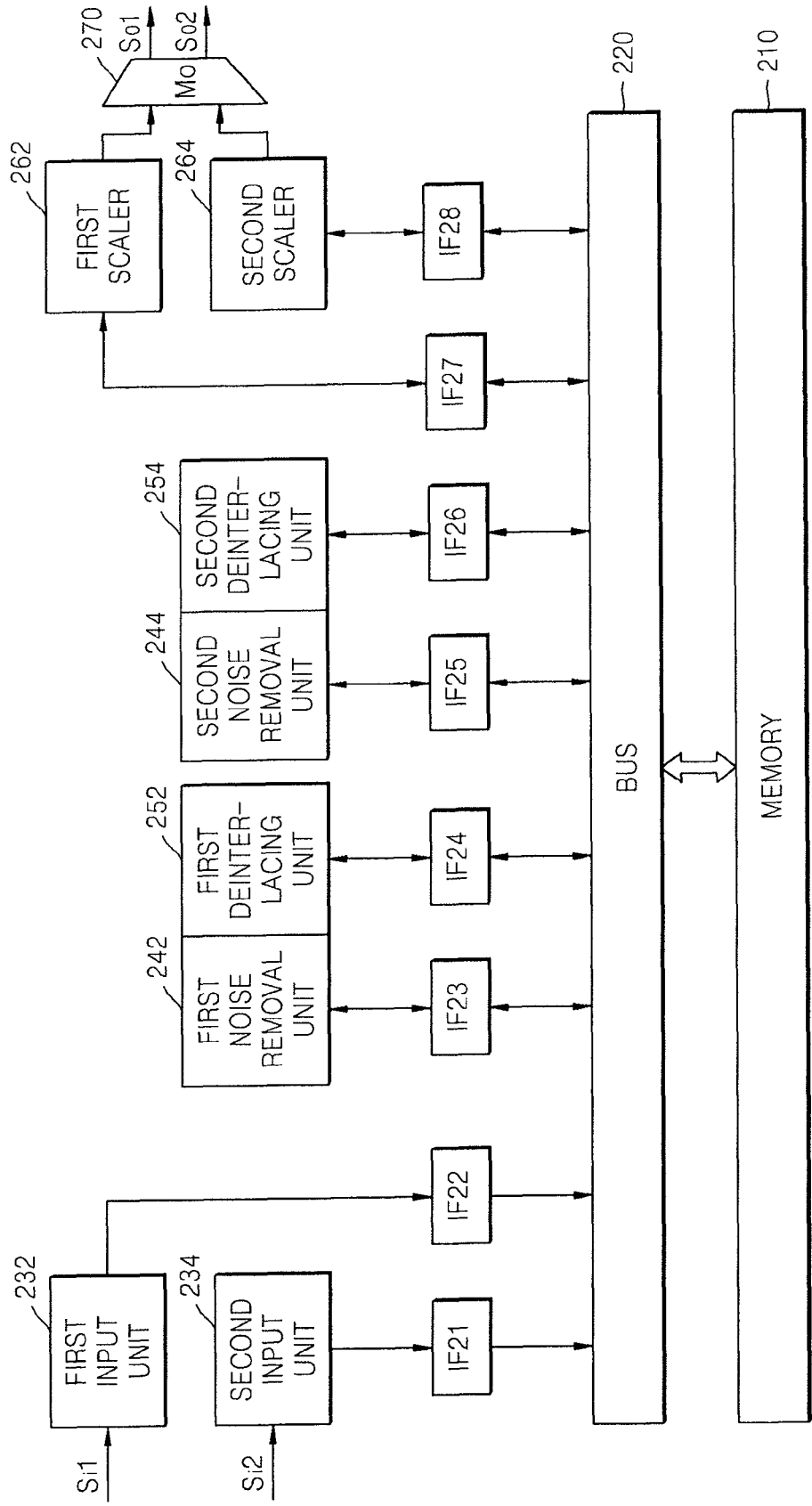
FIG. 2 is a block diagram of a conventional image signal processor used to construct a PIP image.
Figure 3:
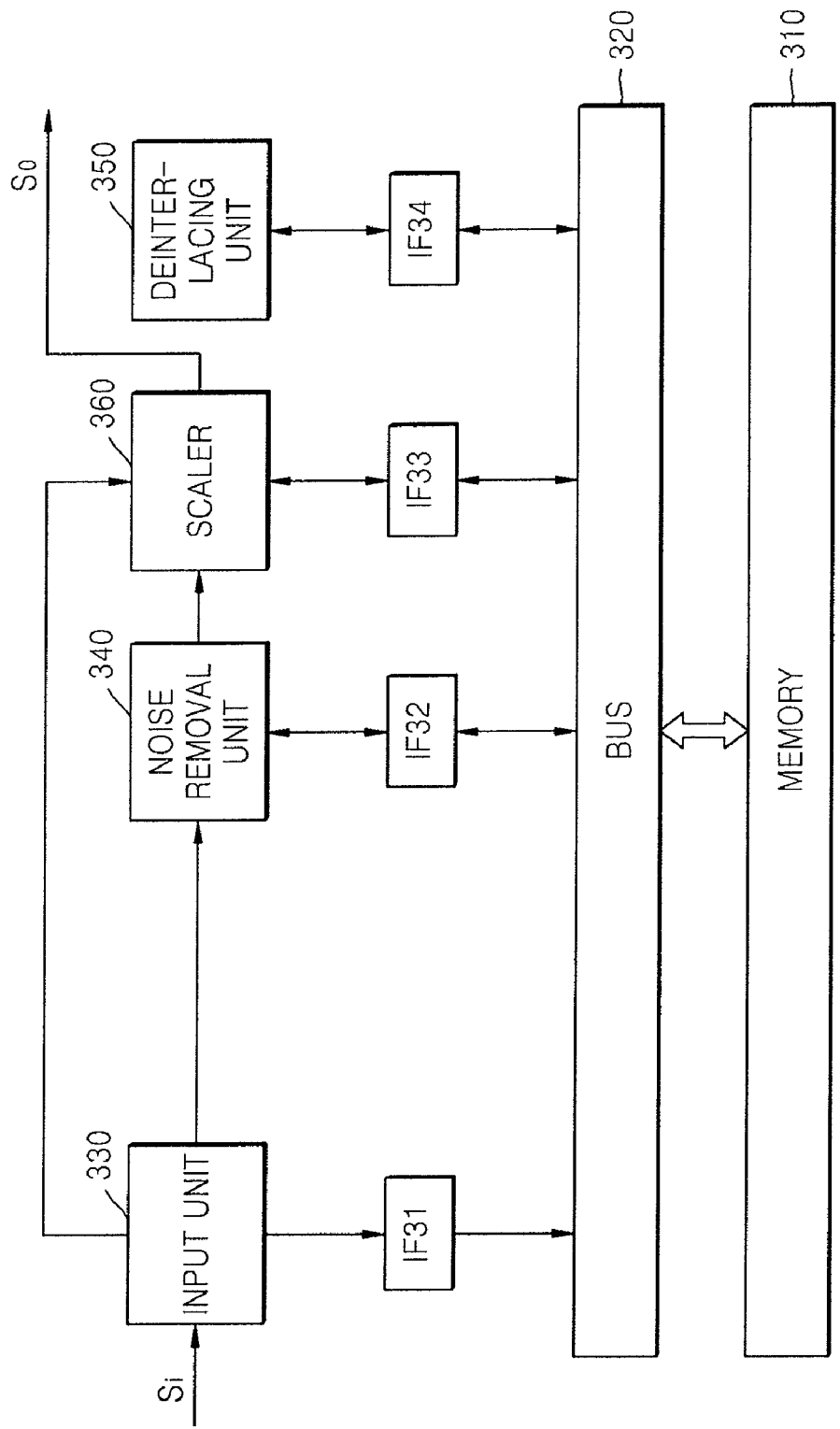
FIG. 3 is a block diagram of an image signal processor according to an exemplary embodiment of the present invention.

FIG. 3 is a block diagram of an image signal processor according to an exemplary embodiment of the present invention. The image signal processor includes a memory 310, a bus 320, a plurality of interface units IF31, IF32, IF33 and IF34, an input unit 330, a noise removal unit 340, a deinterlacing unit 350 and a scaler 360. The image signal processor receives an input image signal Si, processes the input image signal Si and outputs an output image signal So.

The input image signal Si input to the input unit 330 can be directly transmitted to the noise removal unit 340 or the scaler 360. Alternatively, the input image signal Si can be transmitted to the memory 310 via the interface unit IF31 and the bus 320. When the input image signal Si is directly transmitted to the noise removal unit 340 or the scaler 360 without passing through the memory 310, the number of memory accesses is reduced.

The noise removal unit 340 removes noise from the input image signal Si. The input image signal Si output from the noise removal unit 340 can be directly transmitted to the scaler 360 or transmitted to the memory 310 via the interface unit IF32 and the bus 320. When the image signal output from the noise removal unit 340 is directly transmitted to the scaler 360 without passing through the memory 310, the number of memory accesses is reduced.

A route control signal (not shown) determines whether the input image signal Si is transmitted to the scaler 360 via the memory 310, transmitted to the scaler 360 via the noise removal unit 340, or directly transmitted to the scaler 360 in response to the type of the input image signal Si. For example, when the input image signal Si is a main input image signal for forming a main picture of a PIP image, the main input image signal is directly transmitted to the noise removal unit 340 from the input unit 330 for the removal of noise to generate a filtered main input image signal. The filtered main input image signal can be directly transmitted to the scaler 360 from the noise removal unit 340. When the input image signal Si is a sub input image signal for forming a sub picture of the PIP image, the sub input image signal can be directly transmitted from the input unit 330 to the scaler 360. The sub input image signal does not pass through the noise removal unit 340 because there is less need for removing noise when the sub picture is displayed.

The image signal processor can transmit the input image signal from the input unit 330 to the noise removal unit 340 or the scaler 360 or from the noise removal unit 340 to the scaler 360 without passing through the memory 310, thereby reducing the number of memory accesses.

The scaler 360 may reduce, maintain or magnify the image size of the input image signal. For example, when the input image signal is composed of several lines of video data, the scaler 360 may reduce two lines of video data to one line of video data, maintain the two lines of video data, or magnify the two lines of video data to four lines of video data.

The scaler 360 performs an operation of reducing the image size of the input image signal Si and storing the reduced image signal in the memory 310 and an operation of maintaining or magnifying the image size of the image signal stored in the memory 310 and outputting it as the output image signal So.

The scaler 360 maintains or magnifies the image size of the image signal stored in the memory 310 and outputs the image signal having a maintained or magnified image size as the output image signal So, but the scaler 360 is not required to reduce the image size of the image signal stored in the memory 310.

When the image size of the input image signal Si is larger than the image size of the output image signal So, the scaler 360 reduces the image size of the input image signal in advance and stores the input image signal with a reduced image size in the memory 310. When this occurs, there is no need to read two or more lines of video data from the memory 310 for each single memory access when the scaler 360 reads the image signal stored in the memory 310 to output the read image signal as the output image signal So. When the image signal stored in the memory 310 is composed of several lines of video data, the scaler 360 reads one of the several lines of video data from the memory 310 for each memory access.

When the scaler 360 maintains the image size of the image signal stored in the memory 310 and outputs the image signal as the output image signal So, the scaler 360 reads one line of video data from the memory 310 for each single memory access. One line of video data read from the memory 310 corresponds to one line of video data of the output image signal So.

When the scaler 360 magnifies the image size of the image signal stored in the memory 310 and outputs the image signal as the output image signal So, the scaler 360 reads one line of video data from the memory 310 for each single memory access and reads the same line of video data from the memory 310 for another memory access. For example, assume that the scaler 360 magnifies the image size of the image signal twice. Reading the same line of video data from the memory 310 twice corresponds to two lines of video data of the output image signal So.

When the scaler 360 reduces the image size by half of the image signal stored in the memory 310 and outputs the image signal as the output image signal So, which is not required in an exemplary embodiment of the present invention, the scaler 360 should read two lines of video data from the memory 310 for each single memory access. The two lines of video data read from the memory 310 for each memory access corresponds to one line of video data of the output image signal So.

When the scaler 360 is required to read video data of more than two lines from the memory 310 for a single memory access, a higher memory bandwidth is needed. In at least one embodiment of the present invention, however, the scaler 360 reads video data of one line from the memory 310 for each single memory access, and thus the image signal can be processed without requiring a high memory bandwidth.

The deinterlacing unit 350 deinterlaces an interlaced image signal. When the input image signal Si is an interlaced image signal, the input image signal Si passes through the deinterlacing unit 350 in response to the route control signal (not shown). When the input image signal Si is a progressive image signal, the input image signal Si does not pass through the deinterlacing unit 350 in response to the route control signal. However, even when the input image signal Si is an interlaced image signal, the input image signal Si may not pass through the deinterlacing unit 350. For example, when the input image signal Si is a sub input image signal for forming a sub picture of a PIP image, the input image signal can be scaled by the scaler 360 without being deinterlaced and output as a sub output image signal. Because the sub picture of the PIP image generally occupies a small region of the entire image, display quality is not considerably deteriorated even when the sub input image signal is output as the sub output image signal without being deinterlaced.

Figure 4A:
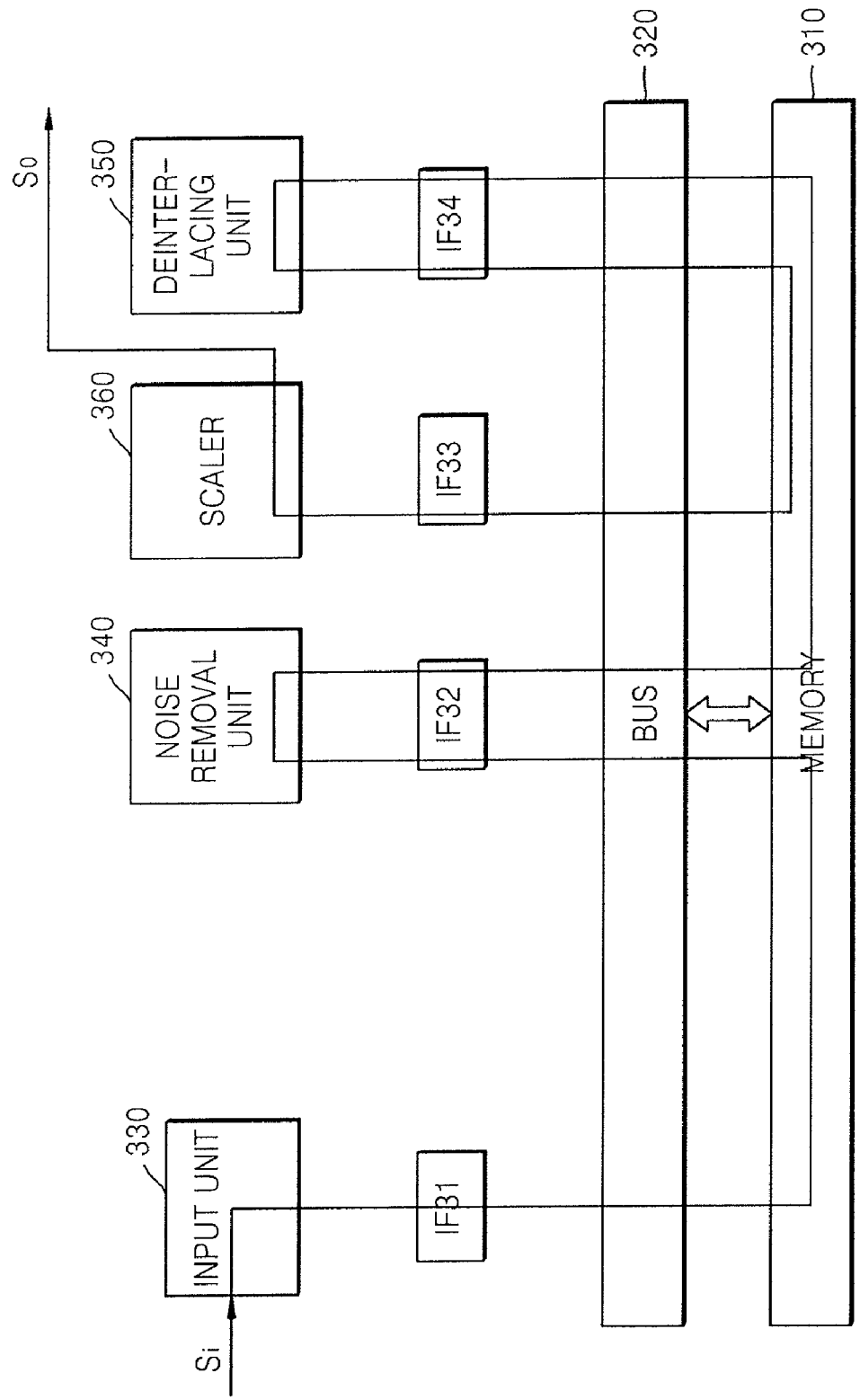

FIGS. 4A through 4E illustrate input image signal processing routes in the image signal processor of FIG. 3. The input image signal processing route of FIG. 4A is not desirable because it requires frequent memory access. The input image signal Si is transmitted from the input unit 330 to the scaler 360 sequentially passing through the memory 310, the noise removal unit 340, the memory 310, the deinterlacing unit 350 and the memory 310. The scaler 360 outputs the output image signal So. However, this processing route requires frequent memory accesses. At least one embodiment of the present invention eliminates this route to minimize the number of memory accesses.

Figure 4B:
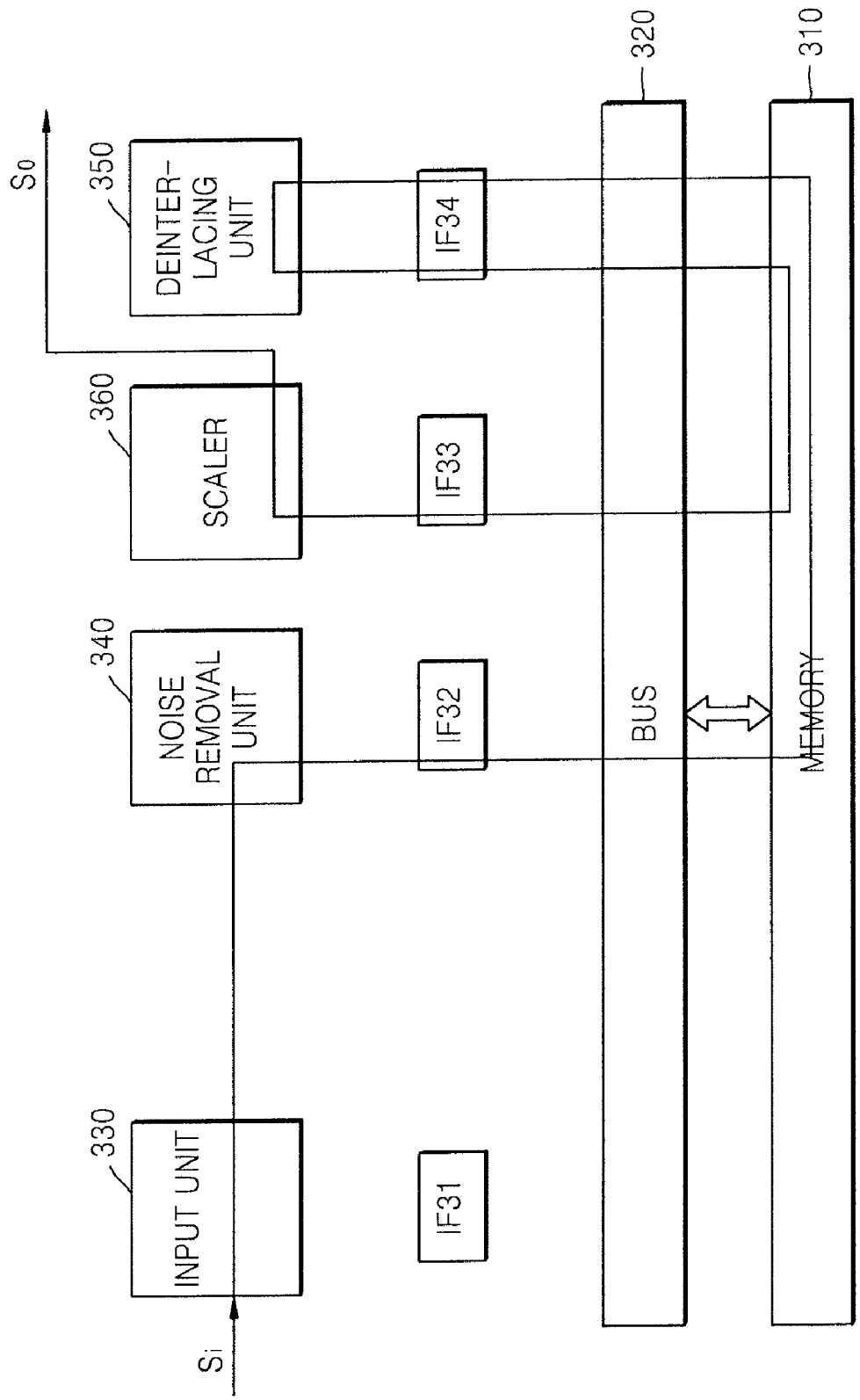

In FIG. 4B, the input image signal Si is directly transmitted to the noise removal unit 340 without passing through the memory 310. The input image signal Si from which noise has been removed by the noise removal unit 340 sequentially passes through the memory 310, the deinterlacing unit 350 and the memory 310, and is transmitted to the scaler 360. Then, the scaler 360 outputs the output image signal So.

Figure 4C:
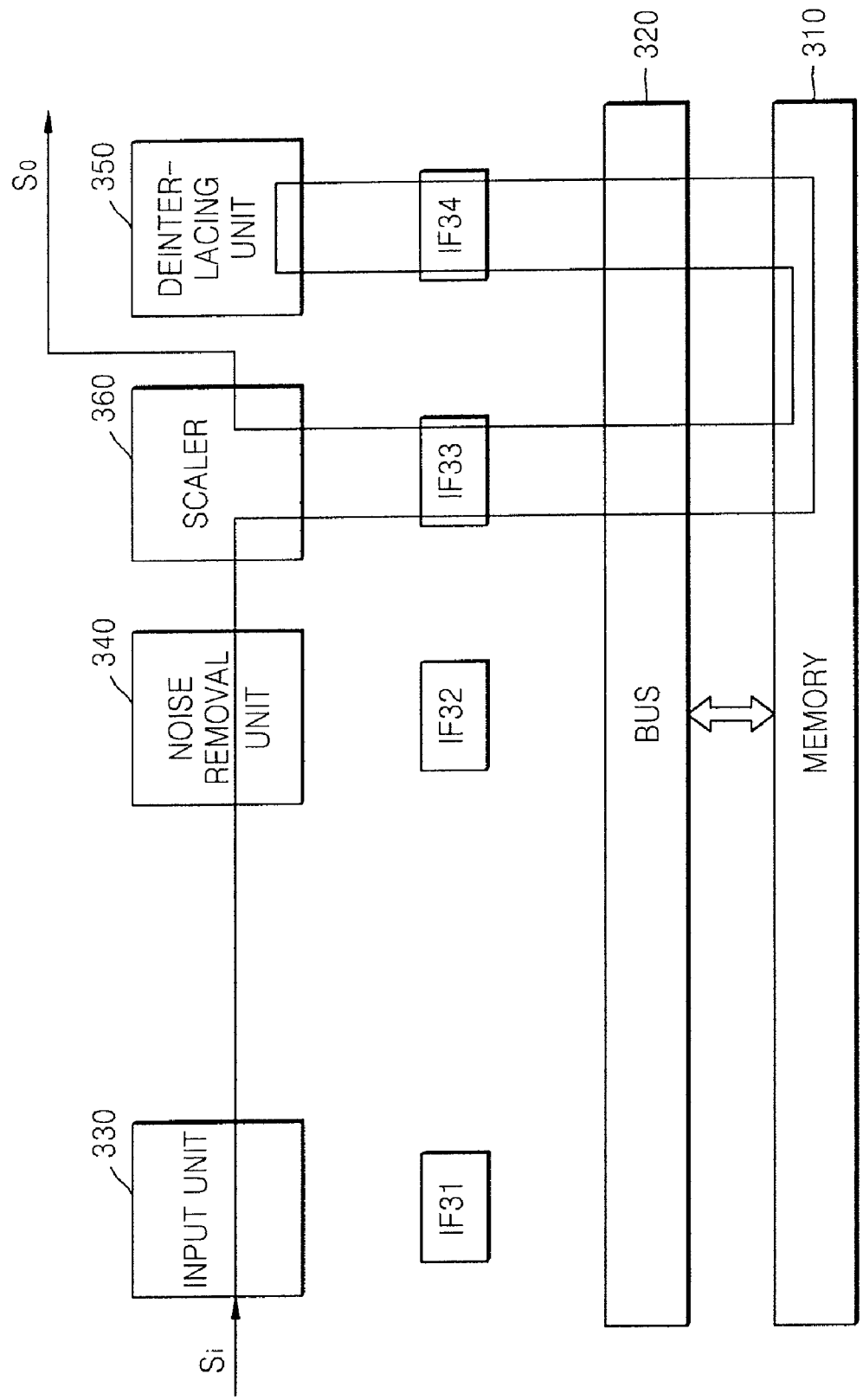

In FIG. 4C, the input image signal Si is transmitted from the input unit 330 to the noise removal unit 340 and then the scaler 360 without passing through the memory 310.

When the image size of the input image signal Si is larger than the image size of the output image signal So, the input image signal Si can be transmitted through the route of FIG. 4C. The image size of the input image signal Si is reduced to correspond to the image size of the output image signal So in advance and stored in the memory 310 to overcome the restriction on the memory bandwidth. For example, when the input image signal Si is composed of n lines of video data and the output image signal So is composed of m lines of video data, where m is smaller than n, the scaler 360 reduces the image size of the input image signal Si to correspond to the m lines and stores the image signal with a reduced size in the memory 310. When the image signal stored in the memory 310 is an interlaced image signal, the image signal may pass through the deinterlacing unit 350.

The scaler 360 maintains the image size of the image signal, which has been reduced to correspond to the m lines and stored in the memory 310, and outputs the image signal as the output image signal So. The scaler 360 reads one line of video data from the memory 310 for each single memory access, and thus the scaling operation can be carried out without requiring a high memory bandwidth. When the scaler 360 maintains the image size of the image signal stored in the memory 310 and outputs it as the output image signal, one line of video data read from the memory 310 corresponds to one line of video data of the output image signal So.

Figure 4D:
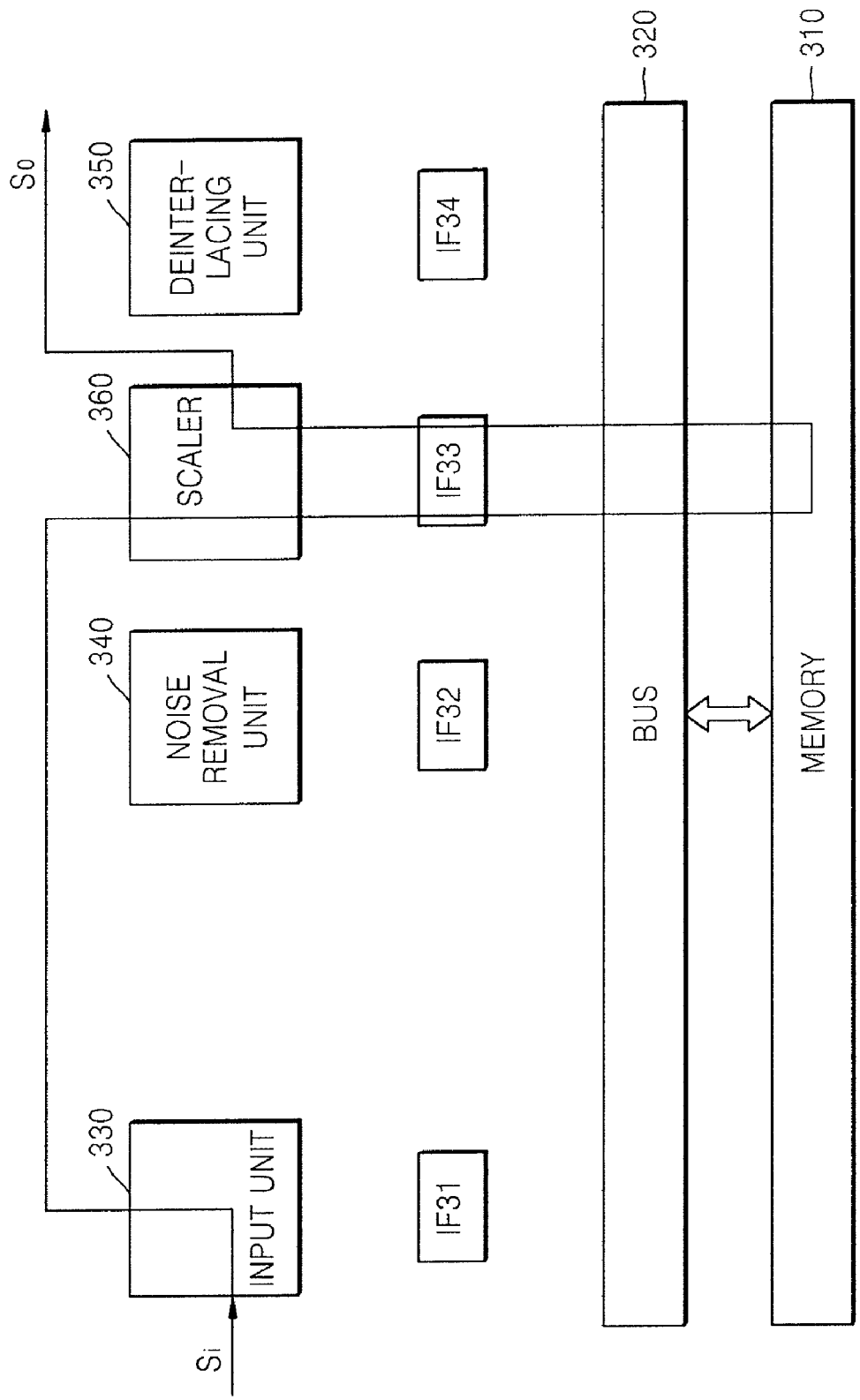

Referring to FIG. 4D, the input image signal Si can be directly transmitted from the input unit 330 to the scaler 360 without passing through the noise removal unit 340 or the memory 310. When the input image signal Si is a sub input image signal for forming a sub picture of a PIP image, the input image signal does not necessarily need to pass through the noise removal unit 340.

The route of FIG. 4E is used when the image size of the input image signal Si is smaller than the image size of the output image signal So. There is no need to reduce the image size of the input image signal Si in advance and store the input image signal in the memory 310 when the image size of the input image signal Si is smaller than the image size of the output image signal So. The scaler 360 magnifies the image size of the input image signal stored in the memory 310 and outputs it as the output image signal So.

For example, when the image size of the input image signal Si corresponds to half the image size of the output image signal So, the input image signal Si passes through the input unit 330 and the noise removal unit 340, and is stored in the memory 310. The scaler 360 reads one line of video data of the image signal stored in the memory 310 for each single memory access and then reads the same line of video data from the memory 310 for another memory access. The line of video data read from the memory 310 twice corresponds to two lines of video data of the output image signal So. In this manner, the image size of the input image signal Si is magnified twice and output as the output image signal So.

A method of processing an image signal which does not require frequent memory accesses is provided according to an exemplary embodiment of the present invention. When the image size of the input image signal Si is larger than the image size of the output image signal So, the input image signal Si is directly transmitted to the input unit 330 or the noise removal unit 340 to the scaler 360. The input image signal Si can be transmitted from the input unit 330 to the noise removal unit 340 and from the noise removal unit 340 to the scaler 360 without passing through the memory 310. Alternatively, the input image signal Si can be directly transmitted from the input unit 330 to the scaler 360 in response to the route control signal.

Then, the scaler 360 reduces the image size of the input image signal Si to correspond to the image size of the output image signal So in advance and stores the image signal having a reduced image size in the memory 310. The image signal with a reduced image size is stored in the form of several lines of video data in the memory 310.

When the image signal stored in the memory 310 is an interlaced image signal, the image signal may pass through the deinterlacing unit 350 to be deinterlaced and then be stored in the memory 310.

Subsequently, the scaler 360 reads the image signal with a reduced size from the memory 310 and outputs the read image signal as the output image signal So. The scaler 360 does not read two or more lines of video data from the memory 310 but reads one line of video data for each single memory access.

Figure 5:
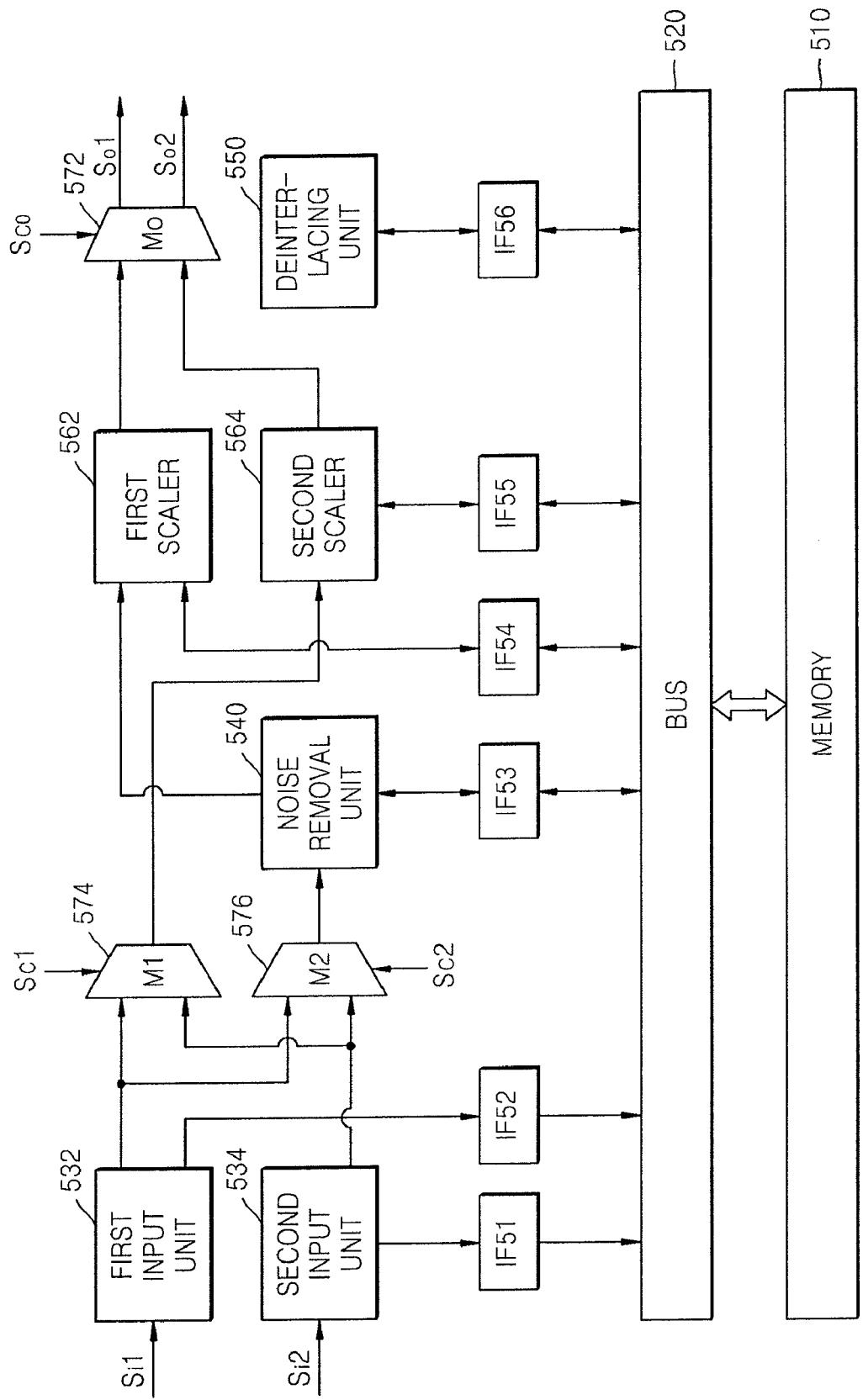
FIG. 5 is a block diagram of a image signal processor according to an exemplary embodiment of the present invention, which is used to construct a PIP image.

FIG. 5 is a block diagram of an image signal processor according to an exemplary embodiment of the present invention, which is used to construct a PIP image.

Referring to FIG. 5, the image signal processor includes a memory 510, a bus 520, a plurality of interface units IF51 through IF56, a first input unit 532 receiving a main input image signal Si1, a second input unit 534 receiving a sub input image signal Si2, a first multiplexer 574 receiving a first route control signal Sc1, a second multiplexer 576 receiving a second route control signal Sc2, a noise removal unit 540, a deinterlacing unit 550, a first scaler 562, a second scaler 564, and an output multiplexer 572.

During a PIP mode, a main picture is obtained from a main output image signal So1 by processing the main input image signal Si1 and a sub picture is obtained from a sub output image signal So2 by processing the sub input image signal Si2.

The output multiplexer 572 receives an image signal output from the first scaler 562 and an image signal output from the second scaler 564 and controls the output of the main output image signal So1 and the sub output image signal So2 in response to an output control signal Sco. The output multiplexer 572 outputs only the main output image signal So1 when the image signal processor is operated in a normal display mode and outputs both the main output image signal So1 and the sub output image signal So2 when the image signal process is operated in the PIP mode.

The main input image signal Si1 input to the first input unit 532 and the sub input image signal Si2 input to the second input unit 534 can be transmitted to the noise removal unit 540, the first scaler 562 or the second scaler 564 via the first multiplexer 574 or the second multiplexer 576. The image signal from which noise has been removed by the noise removal unit 540 can be directly transmitted to the first scaler 562 without passing through the memory 510. The routes of the main input image signal Si1 and the sub input image signal Si2 are controlled by the first multiplexer 574 receiving the first route control signal Sc1 and the second multiplexer 576 receiving the second route control signal Sc2.

The main and sub input image signals Si1 and Si2 are transmitted from the first and second input units 532 and 534 to the first or second scaler 562 or 564 without passing through the memory 510, and thus the number of memory accesses can be minimized.

When the image signal stored in the memory 510 is an interlaced image signal, the deinterlacing unit 550 deinterlaces the image signal received from the memory 510 and stores the deinterlaced image signal in the memory 510. When the image signal stored in the memory 510 is a progressive image signal, the image signal does not pass through the deinterlacing unit 550.

Even when the sub input image signal Si2 is an interlaced image signal, the sub input image signal Si2 may not pass through the deinterlacing unit 550. This is because the sub picture of a PIP image occupies a small region of the entire picture and thus display quality is not considerably deteriorated even when the sub input image signal Si2 is output as the sub output image signal So2 without being deinterlaced.

When the image size of the main input image signal Si1 or the sub input image signal Si2 is larger than the image size of the main output image signal So1 or the sub output image signal So2, the first or second scaler 562 or 564 reduces the image size of the main input image signal Si1 or the sub input image signal Si2 to correspond to the image size of the main output image signal So1 or the sub output image signal So2 in advance and stores the image signal having a reduced size in the memory 510. The image signal having a reduced size is stored in the form of several lines of video data in the memory 510.

When the first or second scaler 562 or 564 reads the image signal stored in the memory 510 and outputs the read image signal as the output image signal, the first or second scaler 562 or 564 reads one line of video data from the memory 510 for each single memory access. Accordingly, the scaling operation can be carried out without requiring a high memory bandwidth.

Figure 6A:
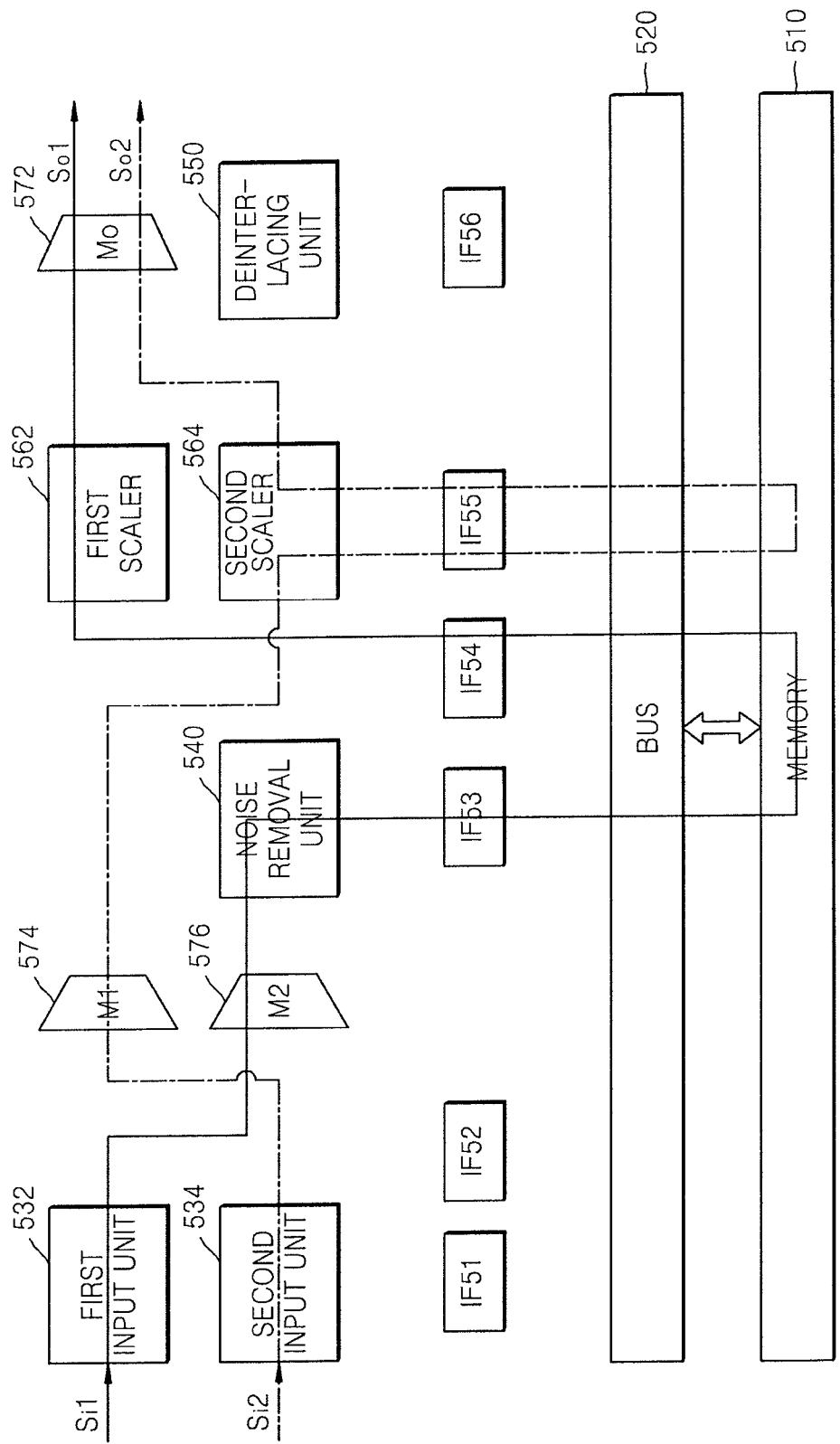
FIGS. 6A, 6B and 6C illustrate operation modes of the image signal processor of FIG. 5.
Figure 6B:
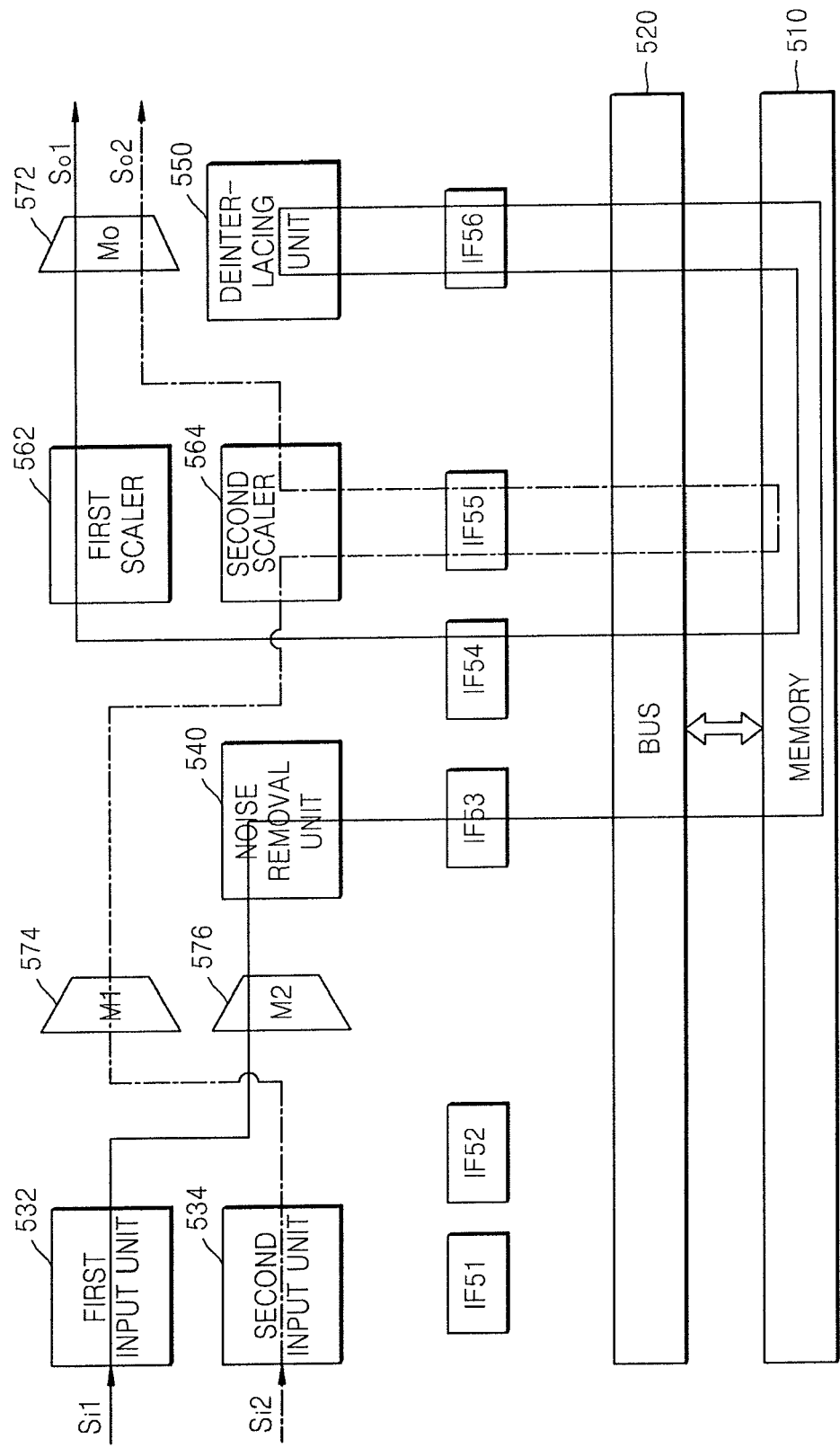
Figure 6C:
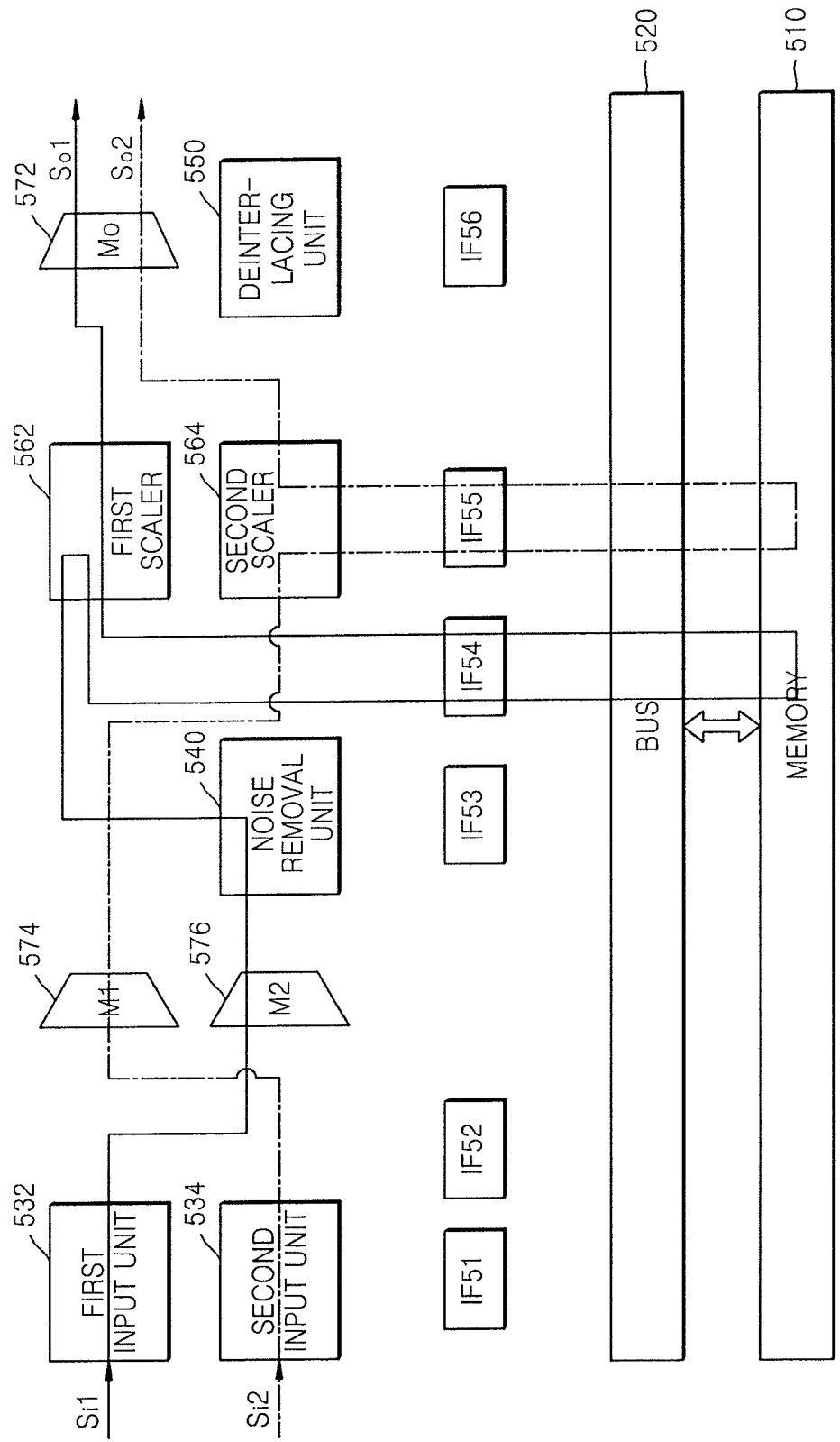

FIGS. 6A, 6B and 6C illustrate exemplary operation modes of the image signal processor of FIG. 5 according to exemplary embodiments of the present invention.

Referring to FIGS. 6A, 6B and 6C, the sub input image signal Si2 is transmitted from the second input unit 534 to the second scaler 564 via the first multiplexer 574. The sub input image signal Si2 does not pass through the noise removal unit 540 and the deinterlacing unit 550. The sub input image signal Si2 is transmitted from the input unit 534 to the second scaler 564 without passing through the memory 510, and thus the number of memory accesses can be reduced.

The second scaler 564 reduces the image size of the sub input image signal Si2 to correspond to the image size of the sub output image signal So2 and stores the image signal with a reduced size in the memory 510. The image signal with a reduced size stored in the memory 510, is output as the sub output image signal So2 via the second scaler 564 and the output multiplexer 572. By reducing the image size of the sub input image signal Si2 to correspond to the image size of the sub output image signal So2 in advance, storing the image signal with the reduced size in the memory 510, and making the second scaler 564 read one line of video data for each single memory access, the scaling operation can be performed without requiring a high memory bandwidth.

Referring to FIG. 6A, the main input image signal Si1 is transmitted from the first input unit 532 via the second multiplexer 576. The noise removal unit 540 removes noise from the main input image signal Si1. When the image size of the main input image signal Si1 from which noise has been removed is larger than or equal to the image size of the main output image signal So1, the main input image signal Si1 is transmitted to the memory 510 and stored therein. The first scaler 562 reads the main input image signal Si1 from the memory 510, and maintains or magnifies the image size of the main input image signal Si1. The image signal with a maintained or magnified image size is output as the main output image signal So1 via the output multiplexer 572.

When the main input image signal Si1, which passes through the first input unit 532, the second multiplexer 576 and the noise removal unit 540 and then is stored in the memory 510, is an interlaced image signal, the main input image signal Si1 requires deinterlacing. Accordingly, the main input image signal Si1 stored in the memory 510 passes through the deinterlacing unit 550 where the main input image signal si1 is deinterlaced and then is stored in the memory 510, as shown in FIG. 6B. The deinterlaced image signal stored in the memory 510 is output as the main output image signal So1 via the first scaler 562 and the output multiplexer 572.

Referring to FIG. 6C, the main input image signal Si1 is transmitted from the first input unit 532 to the noise removal unit 540 via the second multiplexer 576. The noise removal unit removes noise from the main input image signal Si1. The main input image signal from which noise has been removed is transmitted to the first scaler 562 when the image size of the main input image signal Si1 is larger than the image size of the main output image signal So1. The first scaler 562 reduces the image size of the main input image signal received from the noise removal unit 540 to correspond to the image size of the main output image signal So1 and stores the image signal with a reduced image size in the memory 510. The image signal stored in the memory 510 is output as the main output image signal So1 via the first scaler 562 and the output multiplexer 572.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image signal processor for processing a main input image signal and a sub input image signal for forming a picture-in-picture PIP image comprising:
    a first input unit receiving and outputting the main input image signal;
    a second input unit receiving and outputting the sub input image signal;
    first and second multiplexers connected to each receive an output of the first input unit and the second input unit;
    a noise removal unit connected to receive an output of one of the multiplexers for removing noise from an image signal input thereto;
    a first scaler connected to receive an output of the noise removal unit for scaling an image signal input thereto;
    a second scaler connected to receive an output of the other one of the multiplexers for scaling an image signal input thereto; and
    an output multiplexer connected to receive an output of the first and second scaler to provide a main output image signal or a sub output image signal.

2. The image signal processor of claim 1, wherein the main input image signal or the sub input image signal, which has an image size reduced by the first or second scaler, is stored as a plurality of lines of video data in a memory of the image signal processor.

3. The image signal processor of claim 2, wherein the first or second scaler reads one line of video data of the plurality of lines of video data from the memory for each single memory access.

4. The image signal processor of claim 1, wherein the main input image signal is transmitted from the first input unit to the noise removal unit via the second multiplexer to generate a filtered main image signal.

5. The image signal processor of claim 4, wherein the filtered main image signal is transmitted to the first scaler when the image size of the main input image signal is larger than an image size of the main output image signal.

6. The image signal processor of claim 5, wherein the first scaler reduces an image size of the filtered main image signal to correspond to the image size of the main output image signal to generate a reduced main image signal and stores the reduced main image signal in a memory of the image signal processor.

7. The image signal processor of claim 6, wherein the reduced main image signal stored in the memory is output as the main output image signal via the first scaler and the output multiplexer.

8. The image signal processor of claim 1, wherein the sub input image signal is transmitted from the second input unit to the second scaler via the first multiplexer.

9. The image signal processor of claim 8, wherein the second scaler reduces the image size of the sub input image signal to correspond to the image size of a sub output image signal to generate a reduced sub image signal and stores the reduced sub image signal in a memory of the image signal processor.

10. The image signal processor of claim 9, wherein the reduced sub image signal stored in the memory is output as the sub output image signal via the second scaler and the output multiplexer.

11. The image signal processor of claim 1, wherein the output multiplexer outputs only the main output image signal when the image signal processor is operated in a normal display mode and outputs both the main output image signal and the sub output image signal when the image signal processor is operated in a PIP mode.

12. The image signal processor of claim 1, further comprising:
    a deinterlacing unit deinterlacing an image signal input thereto,
    wherein the first scaler receives the output of the noise removal unit sequentially via a memory of the image signal processor and the deinterlacing unit.

13. The image signal processor of claim 1, wherein the first scaler scales a main input image signal corresponding to a main picture of the PIP image, and the second scaler scales a sub input image signal corresponding to a sub picture of the PIP image.

14. An image signal processor for processing a main input image signal and a sub input image signal for forming a picture-in-picture PIP image comprising:
    first and second multiplexers each receiving the main input image signal and the sub input image signal;
    a noise removal unit receiving an output of only the second multiplexer among the first and second multiplexers for removing noise from an image signal input thereto;
    a first scaler receiving an output of the noise removal unit for scaling an image signal input thereto;
    a second scaler receiving only an output of the first multiplexer among the first and second multiplexers for scaling an image signal input thereto; and
    an output multiplexer receiving output of the first and second scaler to provide a main output image signal or a sub output image signal,
    wherein during a PIP mode, the image signal processor is configured to control the first multiplexer to output the sub input image signal to the second scaler and control the second multiplexer to output the main input image signal to the noise removal unit.

15. The image processor of claim 14, wherein the first scaler receives the output of the noise removal unit directly from the noise removal unit.

16. The image signal processor of claim 15, wherein the first scaler receives the output of the noise removal unit sequentially via a memory and a deinterlacing unit of the image signal processor.

17. The image signal processor of claim 15, wherein the second scaler reduces the sub input image signal and stores the reduced image signal in a memory of the image signal processor.

18. The image signal processor of claim 14, wherein the first scaler scales a main input image signal corresponding to a main picture of the PIP image, and the second scaler scales a sub input image signal corresponding to a sub picture of the PIP image.

* * * * *